I. J. HELSETH.
EMERGENCY AXLE AND WHEEL.
APPLICATION FILED MAR. 2, 1920.

1,372,813.

Patented Mar. 29, 1921.
2 SHEETS—SHEET 1.

I. J. HELSETH.
EMERGENCY AXLE AND WHEEL.
APPLICATION FILED MAR. 2, 1920.
1,372,813.
Patented Mar. 29, 1921.
2 SHEETS—SHEET 2.
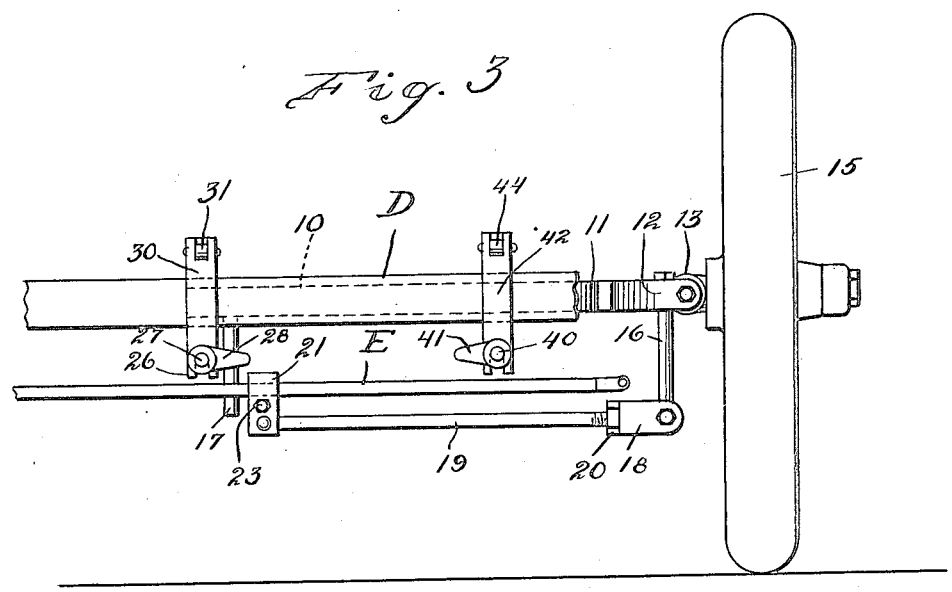
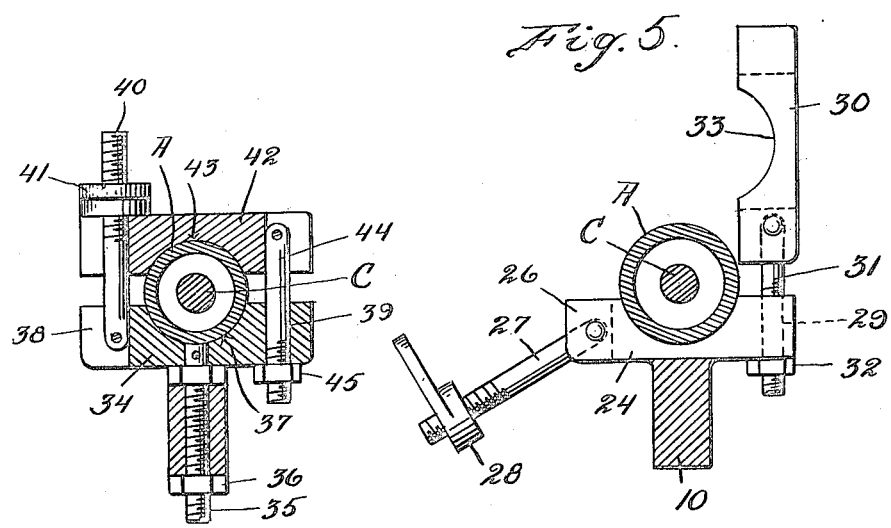

UNITED STATES PATENT OFFICE.

IVER J. HELSETH, OF MADISON, SOUTH DAKOTA.

EMERGENCY AXLE AND WHEEL.

1,372,813. Specification of Letters Patent. Patented Mar. 29, 1921.

Application filed March 2, 1920. Serial No. 362,676.

*To all whom it may concern:*

Be it known that I, IVER J. HELSETH, a citizen of the United States, residing at Madison, in the county of Lake and State of South Dakota, have invented certain new and useful Improvements in Emergency Axles and Wheels, of which the following is a specification.

This invention relates to attachments for automobiles and has for its object the provision of an emergency axle adapted to be clamped upon either the rear axle housing or the front axle of an automobile and carrying a wheel adapted to take the place of a missing ordinary wheel whereby the automobile may be towed or driven to the garage or other place where the necessary repairs may be made; the advantage of the device being that it eliminates the necessity for the employment of the trucks commonly used in connection with a broken axle.

An important object is the provision of a device of this character in which the auxiliary wheel is journaled upon a spindle projecting from a spindle body which is rotatable and with which is connected a rod adapted for connection with the steering arm connecting rod, when the device is used on the front axle, so that the auxiliary wheel may be moved simultaneously with the remaining front wheel so that the automobile may be steered in the ordinary manner, this rod connected with the spindle body being also capable of being secured to a stub projection from the body of the device whereby the auxiliary wheel may be held against horizontal turning movement.

An additional object is the provision of a device of this character which will be simple and inexpensive in manufacture, which may be quickly and easily applied, which will remain firmly in position, which will be efficient and durable in service, and a general improvement in the art.

With the above and other objects and advantages in view, the invention consists in the details of construction to be hereinafter more fully described and claimed, and illustrated in the accompanying drawings in which—

Figure 1:
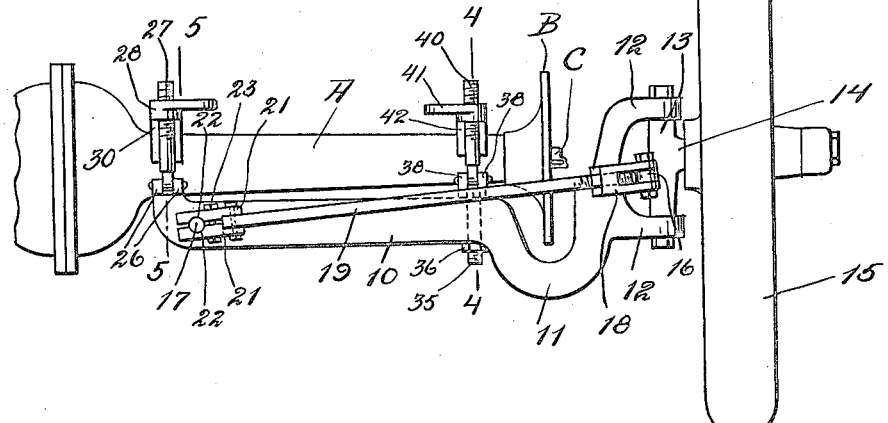
Figure 2:
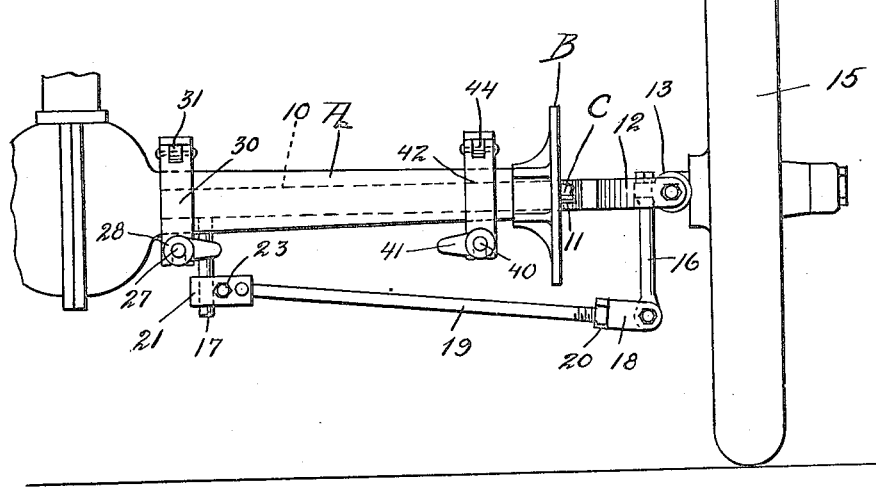

Figure 1 is a rear elevation of one end of a rear axle housing showing my device in position thereon, Fig. 2 is a plan view thereof, Fig. 3 is a plan view of the device showing it associated with a broken front axle, Fig. 4 is a cross sectional view on the line 4—4 of Fig. 1, and Fig. 5 is a cross sectional view on the line 5—5 of Fig. 1, with the clamping member shown swung into open position.

Referring more particularly to the drawings, the letter A designates the rear axle housing of an automobile and B designates the enlarged flange like portion at the outer end thereof against which the rear wheel is disposed. The rear spindle is indicated at $c$ and is shown as broken off. D designates the front axle, also shown as broken off, and E the steering arm connecting rod.

In carrying out my invention I provide a bar 10 which is disposable beneath either the rear axle housing or the front axle and which is formed intermediate its ends with a downwardly offset portion 11. At one end the bar 10 is extended upwardly and formed with vertically spaced arms 12 between which is journally mounted a spindle body 13 from which projects a spindle 14 carrying a wheel 15 of the same size as the regular wheels of the automobile and equipped with a tire. Projecting from the spindle body is a arm 16 and projecting from the opposite end of the bar at one side thereof is a stub 17.

Pivoted upon the end of the arm 16 is a U shaped yoke 18 through the bight portion of which is threaded one end of a rod 19 which carries a lock nut 20 engaging against the yoke. Pivoted upon the free end of the rod 19 is a clamping member formed of two similar plates 21 provided upon their confronting faces with grooves 22 and through which passes a clamping bolt 23. These plates are capable of being clamped upon the stub 17 as shown in Figs. 1 and 2 for holding the spindle body 13 rigid. Owing to the fact that the rod 19 is threaded into the yoke 18 it will be seen that adjustment may be made to vary the position of the wheel 15 so that it may be parallelized with respect to the other wheels of the automobile when my device is applied as will be hereinafter described.

Formed upon the upper side of the bar at its other end is a transverse portion 24 having a curved recess 25 forming a saddle. One end of this portion 24 is bifurcated to provide ears 26 between which is pivoted a bolt 27 carrying a handled nut 28. The other end of the portion 24 is formed with a hole 29. Associated with this portion 24 is a clamping member 30 which is formed at one end with a bifurcation within which is pivoted one end of a bolt 31 extending through the hole 29 and carrying a nut 32. The other end of the clamping member 30 is bifurcated for the reception of the bolt 27. The clamping member 30 is also provided with a curved recess 33 mating with the recess 25 to receive an axle of the automobile.

Located adjacent the offset portion 11 of the bar is a saddle member 34 from which depends a bolt 35 passing through the bar 10 and carrying therebelow a nut 36. By this means the saddle member is rotatable upon the bar but may be secured in adjusted position. The member 34 is provided with a curved recess 37 and has one end formed bifurcated to define ears 38 and its other end formed with a hole 39. Pivoted between the ears 38 is a bolt 40 carrying a handled nut 41. Associated with the saddle member 34 is a clamping member 42 provided with a curved recess 43 and having one end bifurcated for the reception of the bolt 40 and its other end provided with a bifurcation within which is pivoted a bolt 44 passing through the hole 39 and carrying a nut 45.

The use of the device is as follows: In case the rear spindle of an automobile is broken so that a rear wheel becomes detached, the bar 10 is disposed beneath the rear axle housing A, the saddle members 24 and 34 engaging the underside of the housing. The clamping members 30 and 42 are then swung down onto the saddle members and the bolts 27 and 40 swung into the bifurcations at the ends of the clamping members. The handled nuts 28 and 41 are then turned down to clamp the members 30 and 42 against the housing A. It will be observed that the bolts 31 and 44 permit adjustment of the clamping members 30 and 42 toward or from the saddle members so that the curved recesses may receive housings of different diameters. The downward offset 11 in the bar 10 provides for the accommodation of the flange B at the end of the housing A. The clamping plates 21 are engaged upon the stub 17 and the bolt 23 tightened. The parts will then be arranged as shown in Figs. 1 and 2 and it will be readily apparent that the wheel 15 will take the place of the smashed off wheel so that the automobile may be towed or even driven to where the necessary repairs are to be made.

In case a front wheel is smashed off, the spindle or spindle body broken, or the front axle broken, the device is used as shown in Fig. 3. The bar is placed beneath the front axle with the axle clamped between the saddle members 24 and 34 and the clamping members 30 and 42, respectively. Instead of being engaged upon the stub 17, the plates 21 are, in this instance, swung upon their pivotal connection with the rod 19 and clamped upon the steering arm connecting rod E. The wheel 15 will then take the place of the missing ordinary wheel and the automobile may be steered as usual, as the wheel 15 is carried by the movable spindle body and is moved in accordance with the rod F by virtue of the rod 19.

From the foregoing description and a study of the drawings it will be apparent that I have thus provided an emergency axle carrying a wheel and adapted for engagement upon either the front or rear axle of an automobile to take the place of a missing wheel, the parts of the device being so constructed and arranged that the wheel may be turned in steering or be held in straight position.

While I have shown and described the preferred embodiment of the invention, it will of course be understood that I reserve the right to make such changes in the form, construction, and arrangement of parts as will not depart from the spirit of the invention or the scope of the subjoined claims.

Having thus described my invention, I claim:

1. An emergency axle comprising a bar formed adjacent one end with a downwardly offset portion and having said end extended upwardly and formed to provide vertically spaced arms, a spindle body rotatably mounted between said arms and carrying a spindle, a wheel rotatable upon said spindle, an arm projecting from said spindle body, a stub projecting from one side of said bar at the other end thereof, a rod pivotally connected with said last named arm and detachably connected with said stub whereby to hold said spindle body against movement, saddle members carried by said bar, and clamping members associated with said saddle member, said saddle members, and clamping members being adapted for engagement with either the front axle or the rear axle housing of a motor vehicle with said downwardly offset portion accommodating the flange at the outer end of the axle housing.

2. A device of the character described comprising a bar carrying a wheel at one end, a saddle member at the other end of said bar, a second saddle member rotatably mounted upon the top of said bar intermediate the ends thereof, a bolt pivotally connected with one end of each saddle member and carrying a clamping nut, a clamping member associated with each saddle member, a bolt pivotally connected with one end of each clamping member, extending through the associated end of each saddle member and carrying a clamping nut disposed below the latter, and the other end of each clamping member being bifurcated for the reception of the first named bolt, the confronting faces of each saddle member and clamping member being recessed.

3. A device of the character described comprising a bar provided with means whereby it may be clamped beneath the front axle or rear housing of an automobile, a spindle body journaled at one end of said bar and carrying a wheel, a stub projecting from the other end of said bar at one side thereof, an arm projecting from said spindle body, a yoke pivotally connected with said arm, a rod adjustably connected with said yoke, a pair of clamping plates pivotally connected with the other end of said rod and having their confronting faces formed with mating grooves, and a clamping bolt passing through said plates, said plates being engageable upon said stub whereby to hold said spindle body against movement, and said plates being capable of rotation with respect to the rod whereby to be engaged upon the steering arm connecting rod of an automobile.

In testimony whereof I hereto affix my signature.

IVER J. HELSETH.